United States Patent [19]
McPherson

[11] Patent Number: 5,630,616
[45] Date of Patent: May 20, 1997

[54] SEAT FRAME INTEGRATED AIR BAG INFLATOR

[75] Inventor: William G. McPherson, Grand Blanc, Mich.

[73] Assignee: Lear Seating Corporation, Southfield, Mich.

[21] Appl. No.: 601,405

[22] Filed: Feb. 14, 1996

[51] Int. Cl.$^6$ ............................................. B60R 21/22
[52] U.S. Cl. ............................ 280/730.2; 280/728.2
[58] Field of Search ..................... 280/730.2, 730.1, 280/728.2, 728.1, 732, 741; 297/216.1, 216.13

[56] References Cited

U.S. PATENT DOCUMENTS

| | | | |
|---|---|---|---|
| 5,112,079 | 5/1992 | Haland et al. | |
| 5,277,441 | 1/1994 | Sinnhuber | 297/216.1 |
| 5,348,342 | 9/1994 | Haland et al. | |
| 5,393,090 | 2/1995 | Shepherd et al. | 280/728.1 |
| 5,492,361 | 2/1996 | Kim | 280/728.1 |
| 5,499,840 | 3/1996 | Nakano | 280/730.2 |
| 5,503,428 | 4/1996 | Awotwi et al. | 280/730.2 |
| 5,505,487 | 4/1996 | Brown et al. | 280/730.1 |

FOREIGN PATENT DOCUMENTS 4209944  5/1993  Germany ........................ 280/730.1

OTHER PUBLICATIONS

Research Disclosure, Disclosure No. 336112, p. 31.

*Primary Examiner*—Eric D. Culbreth
*Attorney, Agent, or Firm*—Howard & Howard

[57] ABSTRACT

The seat assembly 10 with an inflatable air bag for protecting the occupant of the seat during a collision. More specifically, the air bag assembly, generally shown at 22, is, at least in part, formed integrally with one or both, of the seat frame members 12 and 14. Each of the load bearing frame members 12 and 14 has an integral section 24 thereof extending longitudinally along a portion of the length of thereof. In other words, the integral section 24 is shorter than the entire length of the associated frame member 12 or 14 and the integral section 24 defines an air bag storage pocket or recess 26 and an inflator housing 28. The integral section 24 includes a common wall 30 separating the bag storage pocket 26 from the inflator housing 28. The common wall 30 includes air holes 32 extending therethrough to convey expanding gas from the inflator housing 28 to the pocket 26 for inflating a bag. A rectangular frame 52 seals the mouth of the bag 50 about the periphery of the recess 26 in which the bag 50 is stored. A gas generating cartridge 54 is disposed in the inflator housing 28 to inflate the bag 50.

16 Claims, 3 Drawing Sheets

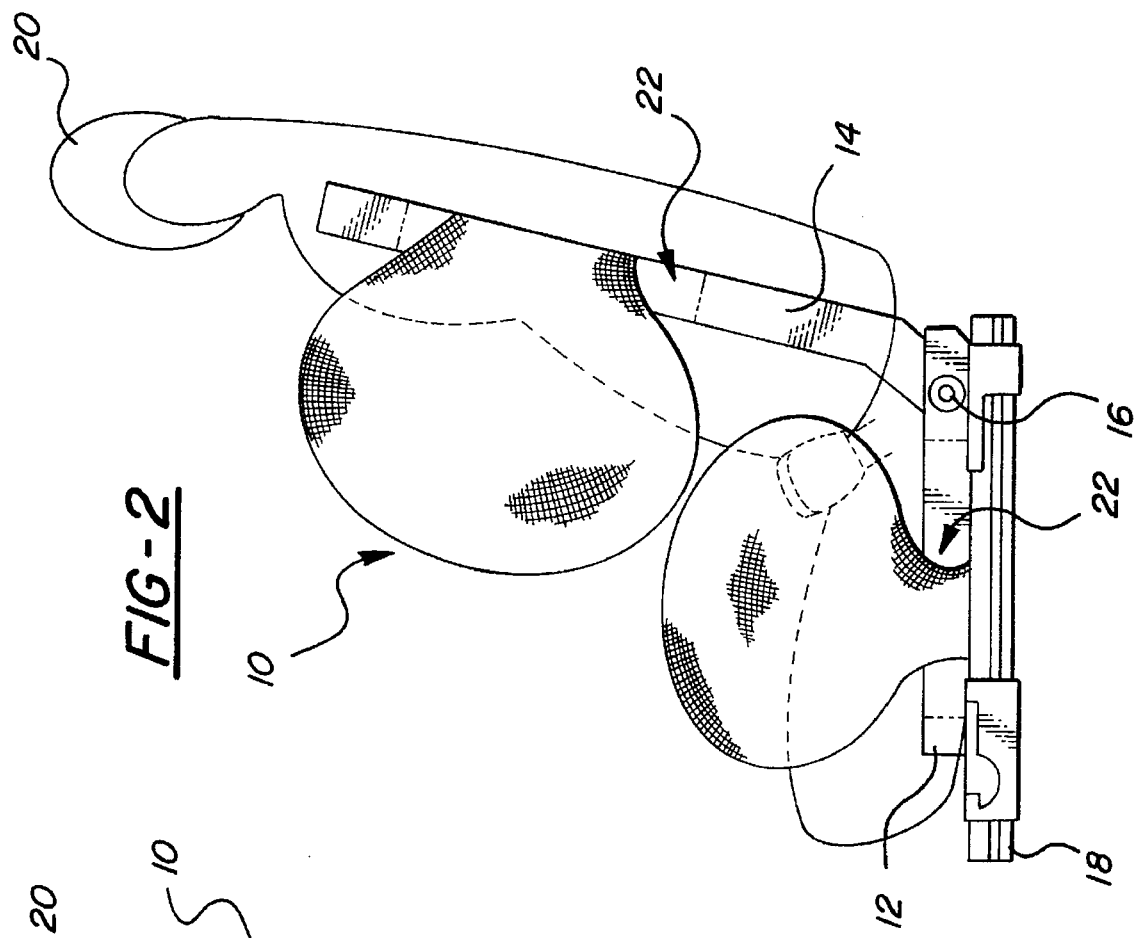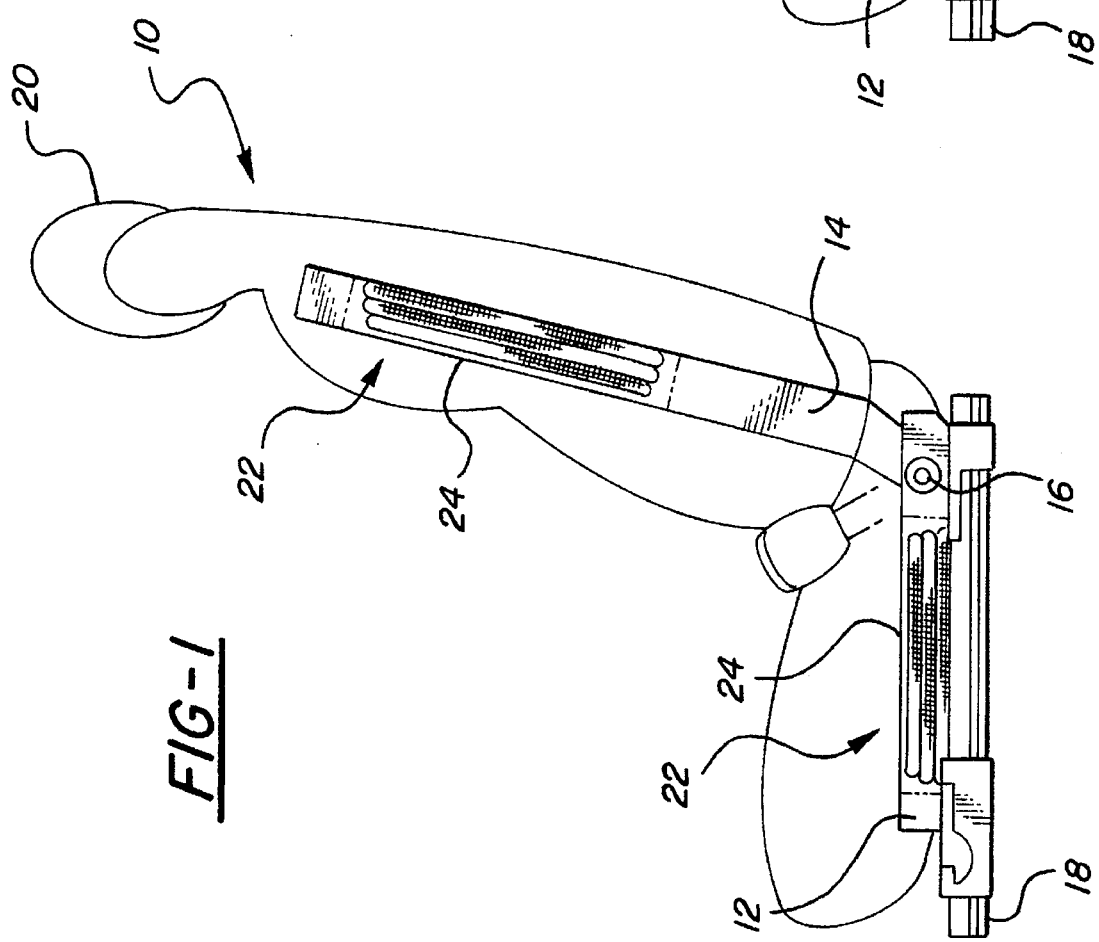

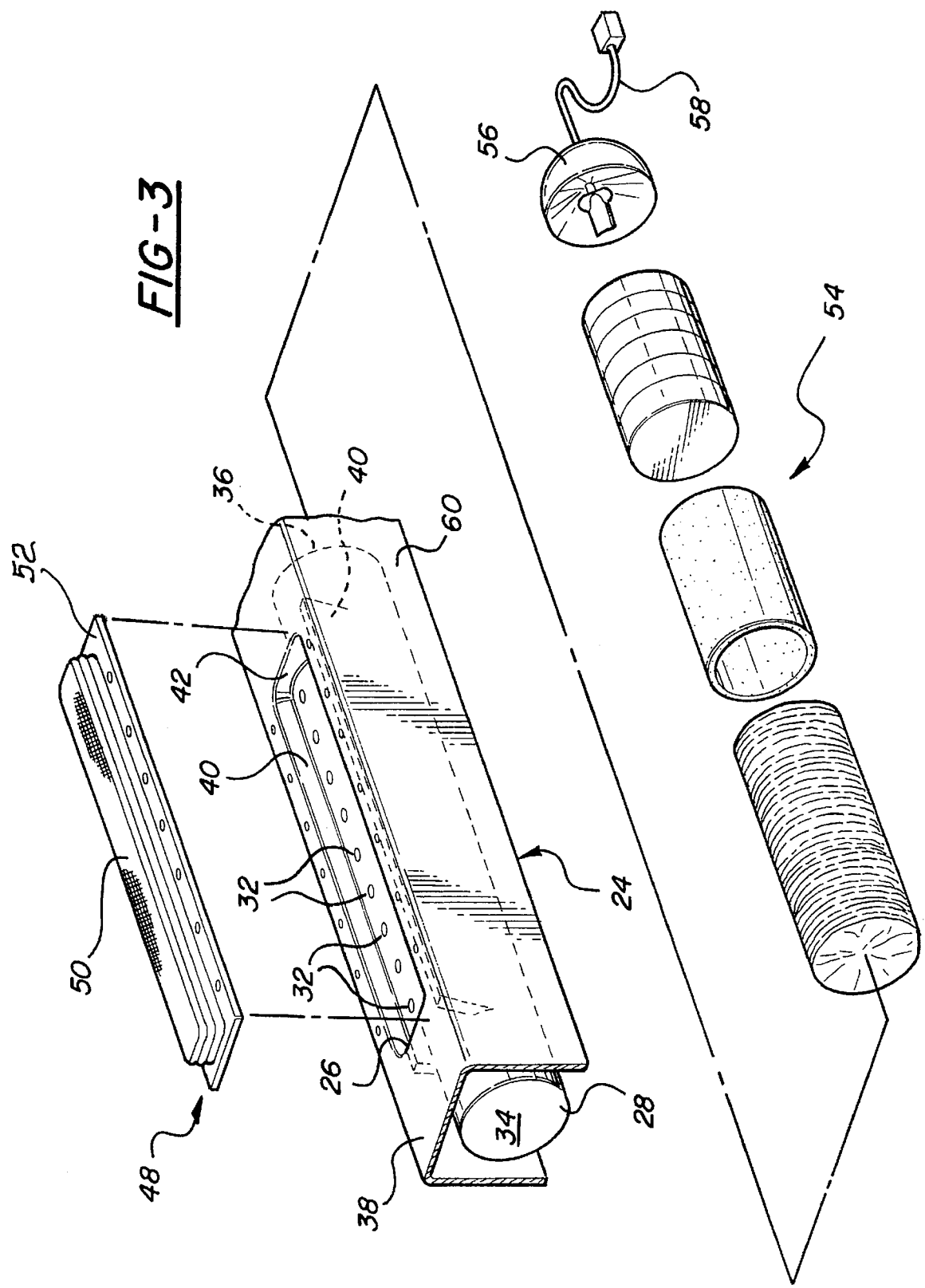

SEAT FRAME INTEGRATED AIR BAG INFLATOR

TECHNICAL FIELD

The subject invention relates a seat assembly for a motor vehicle and which includes an air bag passive restraint system.

BACKGROUND OF THE INVENTION

Air bag passive restraint system has been mounted in a vehicle seat. Examples of such systems are shown in U.S. Pat. Nos. 5,112,079 and 5,348,342, both to Haland et al. However, known systems require the assembly of independent units one of which is an independent inflation housing attached to the frame or other support structure in the seat assembly. Yet another assembly is shown in U.S. Pat. No. 5,419,579 to McPherson et al wherein the bag and gas generator are disposed in a single sheet metal housing.

SUMMARY OF THE INVENTION AND ADVANTAGES

A seat assembly for a vehicle including an inflatable air bag for protecting the occupant of the seat during a collision and assembly comprising a seat frame with occupant supporting materials supported by the seat frame. The seat frame includes a load bearing frame member having an integral section thereof extending longitudinally along a portion of the length thereof and defining an air bag storage pocket and an inflator housing.

Therefore, in accordance with the subject invention, the independent bag and independent gas generating cartridge are easily attached directly to the lead bearing structural frame of the seat assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side elevational view of a seat assembly constructed in accordance with the subject invention;

FIG. 2 is a view like FIG. 1 but showing the air bags inflated;

FIG. 3 is an exploded perspective view of a section of seat frame member and air bag assembly;

DETAILED DESCRIPTION OF THE INVENTION

Figures 4, 5:
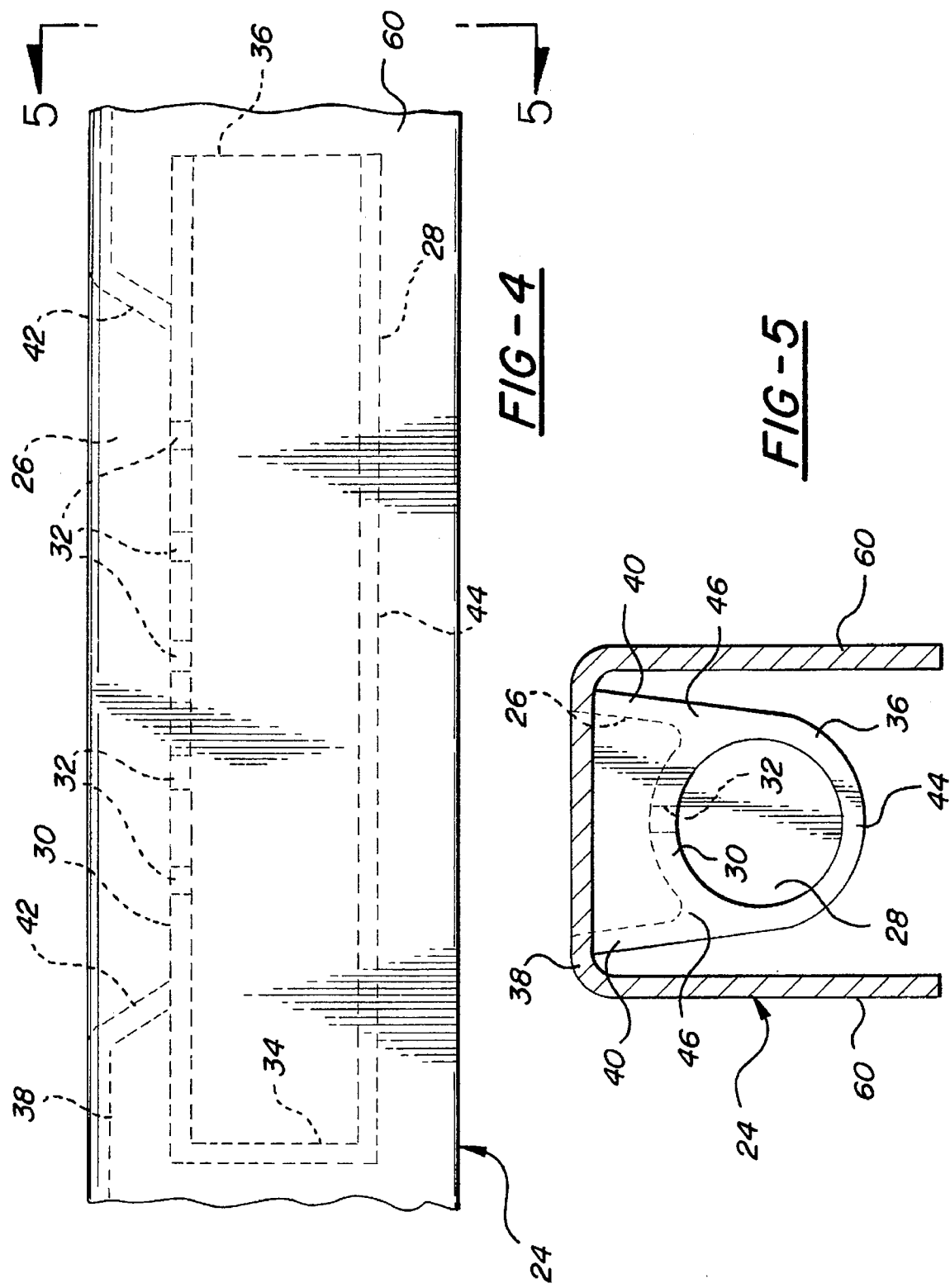
FIG. 4 is a side elevational view of the section of the frame member for supporting the air bag assembly.
FIG. 5 is an end view taken substantially along line 5—5 of FIG. 4.

Referring to the Figures, wherein like numerals reference like or corresponding parts throughout the several views, a seat assembly constructed in accordance with the subject invention is generally shown at 10. The seat assembly is of the type utilized in a motor vehicle. The seat assembly typically includes a seat frame comprising a bottom, sitting or seat frame 12 and a back frame 14 pivoted to the bottom frame 12 at a pivotal connection 16. A seat track 18 supports the bottom frame for adjusting the fore and aft position of the entire seat assembly. The frames 12 and 14 support or suspend occupant supporting materials such as cushions, springs, sheets, or the like. The back frame may also support a headrest 20.

The seat assembly also includes an inflatable air bag for protecting the occupant of the seat during a collision. More specifically, the air bag assembly, generally shown at 22, is, at least in part, formed integrally with one or both, of the seat frame members 12 and 14.

Each of the load bearing frame members 12 and 14 has an integral section 24 thereof extending longitudinally along a portion of the length of thereof. In other words, the integral section 24 is shorter than the entire length of the associated frame member 12 or 14 and the integral section 24 defines an air bag storage pocket 26 and an inflator housing 28.

The integral section 24 includes a common wall 30 separating the bag storage pocket 26 from the inflator housing 28. The common wall 30 includes air holes 32 extending therethrough to convey expanding gas from the inflator housing 28 to the pocket 26 for inflating a bag.

The inflator housing 28 defines a longitudinally extending canister with a closed end 34 and an open end 36, the holes 32 being disposed in the side wall of the canister.

The associated frame member 12 or 14 and the integral section 24 thereof includes a base wall 38 with an integral dished recess therein defining the bag storage pocket 26 with the common wall 30 defining the bottom of the dished recess. The dished recess is defined by lateral walls 40 and end walls 42. The lateral walls 40 extend downwardly below the common wall 30 to define the sides of the canister and into one another to define the bottom 44 of the canister. The end walls 42 of the dished recess are spaced inwardly from the ends 34 and 36 of the canister. The common wall 30, the side walls, i.e., lower portions of lateral walls 40, and the bottom wall 44 of the canister define a cylinder. Also included are gussets 46 of integral material filling in the intersections between the lateral walls 40 of the dished recess and the common wall 30 to round the corners therebetween.

A bag assembly, generally shown at 48 in FIG. 3, is attached to the base wall 38 about the periphery of the dished recess or pocket 26. The bag assembly 48 comprises an inflatable bag 50 folded in the dished recess 26 and a seal means 52 attaching and sealing the opening of the bag to the periphery of the dished recess 26. The seal means comprises a rectangular frame with threaded or riveted fasteners clamping the rectangular frame and the periphery of the open mouth of the bag 50 to the base wall 38 about the edges of the recess or pocket 26.

A propellant cartridge 54 is disposed in the canister and includes a cap 56 in sealing engagement with the open end 36 of the canister with an initiator lead 58 extending from the cap 56. The cap 56 includes a squib initiator which is energized by electrical power supplied through the electrical lead 58, which is in turn controlled by the central system of the vehicle.

The frame members and sections 24 include lateral flanges 60 extending downwardly from and integral with the base wall 38 on either side of the canister.

As will be appreciated from the forgoing description, upon firing of the squib in the cap 56, the cartridge 54 generates gases which are expelled through the holes 32 in the common wall 30. The inflatable bag 50 is folded in the recess or pocket 26 and is forced out of the recess 26 in response to gases coming through the holes 32 to inflate the bag 50. The rectangular frame 52 prevents gases from escaping and holds the inflated bag 50 to the base wall 38.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A seat assembly (10) for a vehicle including an inflatable air bag for protecting the occupant of the seat assembly during a collision, said assembly comprising;

a seat frame (12, 14), occupant supporting materials supported by said seat frame;

said seat frame including a load bearing frame member having a length and an integral section (24) thereof extending longitudinally along a portion of said length thereof;

said integral section (24) defining an air bag storage pocket (26) and an inflator housing, said integral section (24) including a common wall (30) separating said bag storage pocket (26) from said inflator housing, said common wall (30) having air holes (32) extending therethrough, said frame member including a base wall (38) with an integral dished recess therein defining said bag storage pocket (26), said common wall (30) defining the bottom of said dished recess, said dished recess (26) being defined by lateral walls (40) and end walls (42), said lateral walls (40) extending downwardly below said common wall (30) to define opposing side walls of said inflator housing and into one another to define a bottom wall (44) of said inflator housing, said end walls (42) of said dished recess (26) being spaced inwardly from said ends (34, 36) of said inflator housing.

2. A seat assembly as set forth in claim 1 wherein said inflator housing defines a longitudinally extending canister with a closed end (34) and an open end (36).

3. A seat assembly as set forth in claim 2 including a bag assembly attached to said base wall (38) about the periphery of said dished recess (26).

4. A seat assembly as set forth in claim 3 wherein said bag assembly comprises an inflatable bag (50) folded in said dished recess (26) and a seal member (52) attaching and sealing the opening of said bag (50) to said periphery of said dished recess (26).

5. A seat assembly as set forth in claim 4 wherein said common wall (30), said side walls and said bottom wall (44) of said canister define a cylinder.

6. A seat assembly as set forth in claim 5 including gussets (46) of integral material interconnecting said lateral walls (40) of said dished recess (26) and said common wall (30).

7. A seat assembly as set forth in claim 4 including a propellant cartridge (54) disposed in said canister, said cartridge (54) including a cap (56) in sealing engagement with said open end (36) of said canister, an initiator lead (58) extending from said cap (56).

8. A seat assembly (10) for a vehicle including an inflatable air bag for protecting occupant of an seat assembly during a collision, said assembly comprising; p1 a seat frame (12, 14), occupant supporting materials supported by said seat frame;

said seat frame including a load bearing frame member having a length and an integral section (24) thereof extending longitudinally along a portion of said length thereof;

said integral section (24) defining an air bag storage pocket (26) and an inflator housing, said integral section (24) including a common wall (30) separating said bag storage pocket (26) from said inflator housing, said common wall (30) having air holes (32) extending therethrough, said frame member including a base wall (38) with an integral dished recess therein defining said bag storage pocket (26), said common wall (30) defining the bottom of said dished recess, said dished recess (26) being defined by lateral walls (40) and end walls (42), said lateral walls (40) extending downwardly below said common wall (30) to define opposing side walls of said inflator housing and into one another to define a bottom wall (44) of said inflator housing, said frame member including lateral flanges (60) extending downwardly from and integral with said base wall (38) on either side of said inflator housing.

9. An inflatable air bag assembly for protecting the occupant of a seat of a vehicle during a collision, said assembly comprising;

a support member for supporting said air bag assembly including a load bearing frame member having a length and a one piece section (24) defining an air bag storage pocket (26) and an inflator housing, said section (24) including a common wall (30) separating said bag storage pocket (26) from said inflator housing, said common wall (30) having air holes (32) extending therethrough, said section (24) including a base wall (38) with an integral dished recess (26) therein defining said bag storage pocket (26), said common wall (30) defining the bottom of said dished recess (26), said dished recess (26) being defined by lateral walls (40) and end walls (42), said lateral walls (40) extending downwardly below said common wall (30) to define opposing side walls of said inflator housing and into one another to define a bottom wall (44) of said inflator housing, said inflator housing defining a longitudinally extending canister with a closed end (34) and an open end (36), said end walls (42) of said dished recess (26) being spaced inwardly from said ends (34, 36) of said inflator housing.

10. An assembly as set forth in claim 9 wherein said section (24) includes a base wall (38) with an integral dished recess (26) therein defining said bag storage pocket (26), said common wall (30) defining the bottom of said dished recess (26).

11. An assembly as set forth in claim 10 including a bag assembly (48) attached to said base wall (38) about the periphery of said dished recess (26).

12. An assembly as set forth in claim 11 wherein said bag assembly (48) comprises an inflatable bag (50) having an opening and folded in said dished recess (26) and a seal member (52) attaching and sealing the opening of said bag (50) to said periphery of said dished recess (26).

13. An assembly as set forth in claim 9 wherein said common wall (30), said side walls and said bottom wall (44) of said canister define a cylinder.

14. An assembly as set forth in claim 13 including gussets (46) of integral material interconnecting said lateral walls (40) of said dished recess (26) and said common wall (30).

15. An assembly as set forth in claim 9 including a propellant cartridge (54) disposed in said canister, said cartridge (54) including a cap (56) in sealing engagement with said open end (36) of said canister and an initiator lead (58) extending from said cap (56).

16. An inflatable air bag assembly for protecting an occupant of a seat of a vehicle during a collision, said assembly comprising;

a support member for supporting said air bag assembly including a load bearing frame member having a length and a one piece section (24) defining an air bag storage pocket (26) and an inflator housing, said section (24) including a common wall (30) separating said bag storage pocket (26) from said inflator housing, said common wall (30) having air holes (32) extending therethrough, said section (24) including a base wall (38) with an integral dished recess (26) therein defining said bag storage pocket (26), said common wall (30) defining the bottom of said dished recess (26), said dished recess (26) being defined by lateral walls (40) and end walls (42), said lateral walls (40) extending downwardly below said common wall (30) to define opposing side walls of said inflator housing and into one another to define a bottom wall (44) of said inflator housing, said section (24) including lateral flanges (60) extending downwardly from and integral with said base wall (38) on either side of said inflator housing.

* * * * *